United States Patent Office 3,098,845
Patented July 23, 1963

3,098,845
REMOVAL OF METAL CONTAMINANTS FROM POLYMERS WITH CHELATING AGENTS
Neville Leverne Cull and Clyde Lee Aldridge, Baker, La., assignors to Esso Research and Engineering Company, a corporation of Delaware
No Drawing. Filed Nov. 23, 1955, Ser. No. 548,762
18 Claims. (Cl. 260—94.9)

This invention relates to polymerization and more particularly relates to a novel method for removing metal contaminants from polymeric products.

The art is well familiar with the preparation and uses of a wide variety of polymeric products. More specifically, polymeric products are used in a wide variety of applications such as for plastics, film-forming materials, tires, lubricant additives and the like. Many of these polymeric products are prepared employing metal compounds as catalysts in the polymerization reaction. In many instances it is highly desirable to prepare a polymeric product having a low metal content. For example, the presence of metals (or ash-forming ingredients) unfavorably affects the electrical properties and color of the polymeric products.

Recently a new method has been developed for preparing polymeric products wherein monomers are polymerized in the presence of a catalyst obtained by mixing a reducing metal compound (e.g., aluminum trialkyl or dialkyl aluminum chloride) with a reducible metal compound (e.g., titanium tetrachloride). This process has been found to be both economical and effective. Perhaps the most serious problem encountered in this process is the presence of a relatively high proportion of metal contaminants in the final polymeric products. Conventional polymer purification techniques have been generally unsuccessful in reducing the proportion of metal contaminants or ash-forming ingredients below the levels desired for good color and good electrical properties. Thus the finding of a method for reducing the proportion of metal contaminants in the polymeric products prepared by this method is essential to its commercial success in a number of fields of application.

It has now been found that polymeric products containing metal contaminants or ash-forming ingredients may be effectively purified by washing with a chelating agent to thereby remove the metal contaminants therefrom. The purification method of this invention is particularly applicable to the new type of polymeric products prepared by polymerizing monomers in the presence of a catalyst prepared by mixing a reducing metal compound with a reducible metal compound. Particularly effective washing agents useful in the present invention are 1,3 dicarbonyl compounds such as diketones, keto esters and keto acids. Although these particular chelating agents may be effectively employed by themselves in the washing operation, it is particularly preferred to employ them in conjunction with inert diluents (or solvents) and/or with other washing agents such as alcohols.

As stated above, the present invention has been found to be particularly effective in removing metal contaminants or ash-forming ingredients from polymeric products produced by polymerizing monomers in the presence of a catalyst obtained by mixing a reducing metal compound with a reducible metal compound.

The catalyst employed in this type of polymerization reaction is formed simply by mixing a metal compound, having reducing properties with a reducible metal compound in the presence of an inert liquid diluent. More particularly, the metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, these aluminum compounds have the general formula

where R and R' are members selected from the group consisting of hydrogen, alkyl radicals and aryl radicals and X is a member selected from the group consisting of hydrogen, halogen atoms, alkoxy radicals, aryloxy radicals, secondary amino radicals, secondary acid amide radicals, mercapto radicals, thiophenol radicals, radicals of carboxylic acids and radicals of sulfonic acids. The most commonly used aluminum compounds are (1) dialkyl aluminum monohalides containing about 2 to 4 carbon atoms in the alkyl groups and chlorine or bromine atoms, particularly chlorine atoms, and (2) aluminum trialkyls containing about 2 to 4 carbon atoms in the alkyl groups.

The reducible metal compound is generally one of a metal of groups IV–B, V–B, VI–B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, freshly precipitated oxides or hydroxides, organic compounds such as alcoholates, acetates, benzoates or acetyl acetonates. The most commonly used salts are those of titanium, zirconium, thorium, uranium and chromium. Titanium salts are particularly useful, such as titanium tetrachloride, titanium oxychloride or titanium acetyl acetonate.

As stated above, the catalyst mixture is prepared simply by mixing the metal compound having reducing properties with the reducible heavy metal compound in the presence of an inert liquid diluent. Generally the molar ratio of the reducing metal compound to the reducible metal compound is in the range of about 1:3 to 12:1, more preferably about 1:2 to 3:1. The catalyst mixture is prepared generally using an inert liquid diluent in an amount sufficient to form a mixture containing about 0.2 to 25.0 weight percent of the catalyst components, and employing mixing temperatures in the range of about −20 to 150° F. and mixing times of about 5 minutes to 24 hours. The optimum conditions for preparing the catalyst depend in large measure on the particular aluminum alkyl used as the reducing agent. For example, aluminum triethyl can be employed using relatively low concentrations and temperatures to form an active catalyst. On the other hand, when using aluminum diethyl chloride at approximately .5 weight percent concentration, heating times of about 15 to 30 minutes at temperatures of about 120 to 140° F. give the most active catalyst. When the two catalyst components are mixed in the presence of the inert liquid diluent, a precipitate is generally formed which is insoluble in the inert liquid diluent.

A wide variety of polymeric products can be prepared by employing the above-described catalyst mixtures of a reducing metal compound with a reducible metal compound. These catalysts are particularly effective for polymerizing ethylene but are also effective for preparing other homopolymers or copolymers, particularly those of hydrocarbon monomers. For example, polypropylene and copolymers of ethylene and propylene can be prepared by this polymerization method.

Generally an inert liquid diluent will be employed in the polymerization process to facilitate the polymerization reaction. The amount of the inert liquid diluent employed in the polymerization process should be such that the final polymeric product in the reaction mixture does not exceed about 40 weight percent so that a relatively fluid reaction mixture is produced. Generally the amount of inert diluent is such that the polymeric product in the final reaction mixture is in the range of about 1% to 25% by weight. The proportion of catalyst, based on the inert liquid diluent, will generally be in the range of about 0.05 to 0.5 weight percent, usually about 0.1 to 0.3 weight percent.

The polymerization reaction conditions, that is, time, temperature and pressure, are adjusted to produce polymers or copolymers having molecular weights generally of at least about 2,000, usually at least about 10,000. Polymeric products having molecular weights up to 2,000,000 to 5,000,000 or higher may be prepared. Generally, temperatures in the range of about −40 to 200° C., usually about 20° to 80° C. (e.g. about 50° to 60° C.), are employed. Higher temperatures can be employed if desired, but temperatures above about 250° C. are undesirable generally since the catalyst decomposes to a considerable extent at this temperature. In general, pressures in the range of about to 250 atmospheres or higher are employed. If desired, subatmospheric pressures can be employed with certain monomers. The polymerization of ethylene can be carried out conveniently by employing pressures of about 1 to 10 atmospheres. An advantage of this process is that relatively low pressures can be employed. In order to obtain polymeric products having molecular weights above about 2,000, a polymerization reaction time of at least about 15 minutes will be required. Generally, polymerization reaction times in the range of about 15 minutes to 24 hours, usually about 2 to 6 hours, will be employed.

Upon completion of the polymerization reaction, the polymeric product is conventionally separated from the reaction mixture by filtration or distillation, the polymeric product washed with materials such as alcohols and then dried by heating. Generally these polymeric products will yield about .02 to .4%, usually about .04 to .2% by weight of ash as determined by an analysis for metals from which the ash content is calculated.

In accordance with the present invention, the separated polymeric product (either dried or undried) is washed with a chelating agent. More particularly, the chelating agents useful in the present invention are 1,3 dicarbonyl compounds such as diketones, keto esters and/or keto acids (the diketones and keto esters are particularly effective in removing metal contaminants from polymers, especially polyethylene). The preferred keto compounds useful in the present invention have the formula $$X-\overset{O}{\underset{\|}{C}}-CH=\overset{O}{\underset{\|}{C}}-Y$$
$$\underset{Z}{|}$$

where X, Y and Z are similar or different groups chosen from the following (1) H.
(2) OH.
(3) OR, where R is a saturated aliphatic group containing 1 to 6 carbon atoms.
(4) R', where R' is a saturated aliphatic group containing 1 to 6 carbon atoms.
(5) R'', where R'' is an aromatic or substituted aromatic group.

Particularly preferred 1,3 dicarbonyl compounds have the following formula:

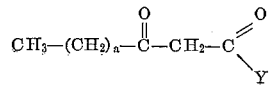

where "a" is an integer having a value of 0 to 3 and Y represents a member selected from the group consisting of the radicals OR and R', R and R' preferably representing alkyl radicals containing 1 to 4 carbon atoms. Specific examples of the 1,3 carbonyl compounds useful in this invention include the following:

| Example | X | Y | Z |
|---|---|---|---|
| 1 | CH₃ | CH₃ | H |
| 2 | CH₃ | OC₂H₅ | H |
| 3 | C₂H₅ | OCH₃ | H |
| 4 | C₂H₅ | OCH₃ | CH₃ |
| 5 | C₂H₅ | C₂H₅ | H |
| 6 | CH₃ | C₂H₅ | CH₃ |
| 7 | CH₃ | H | H |
| 8 | H | H | H |
| 9 | C₆H₅ | CH₃ | H |
| 10 | C₆H₅ | C₆H₅ | H |
| 11 | CH₃ | OH | H |

The preferred washing agents of the present invention are acetyl acetone (Example 1 above) and ethyl aceto acetate (Example 2 above) since these washing agents are particularly effective for the purposes of the present invention.

The amount of the keto compound employed in the washing operation of this invention will generally be in the range of 0.1 to 50.0% by weight and preferably in the range of about 0.1 to 10% (e.g. 1 to 10%) by weight based on the polymeric product to be washed. Generally it is desirable to carry out the washing at a temperature in the range of about 80° to 250° F., preferably 160° to 200° F. Washing times in the range of about 0.5 to 24 hours, preferably about 2 to 6 hours, are employed. The washing operation of this invention is preferably carried out employing a high degree of agitation such as is obtained with conventional commercial stirring apparatus. Very effective washings of polymeric products in accordance with the present invention are obtained when the washings are carried out in an inert atmosphere such as nitrogen. In general, the washing operation will be carried out in a non-aqueous medium.

It is particularly preferred to carry out the washing of the polymeric product with the keto compounds of the present invention in the presence of other liquid organic compounds, namely, inert liquid organic diluents and/or other organic washing agents. More particularly, the washing step with the keto compound may be carried out in the presence of an inert hydrocarbon diluent such as, for example, saturated aliphatic hydrocarbons containing 5 to 10 carbon atoms, such as hexane and heptane. Other hydrocarbon diluents which may be employed include benzene, toluene, petroleum mineral oils and cyclohexane.

The washing step of the present invention may also be carried out in conjunction with conventional organic washing agents such as saturated aliphatic hydrocarbon alcohols. Such alcohols which are particularly useful in this invention are those containing about 1 to 5 carbon atoms, such as methyl, ethyl, propyl, butyl and amyl alcohols, mixtures of amyl alcohols such as the pentasols, etc. Other conventional washing agents which may be employed in the washing step of the present invention include acetone, methyl ethyl ketone, methyl isobutyl ketone, formate or acetate esters of 1 to 4 carbon atom alcohols, etc.

In a preferred embodiment of this invention, the polymeric product is initially washed with a conventional washing agent such as the saturated aliphatic hydrocarbon alcohols mentioned above, e.g., butyl alcohol, and thereafter the polymeric product is washed with the dicarbonyl compounds of the present invention. It will be understood, however, that the washing of the polymeric products with the dicarbonyl compounds of the present invention need not necessarily be carried out as a final step. More specifically, if desired, the polymeric product after washing with the keto compounds of the present invention may be further washed employing conventional washing agents such as described above, e.g., alcohols, acetone and the like. A final wash with alcohols, acetone, or other ketones is particularly preferred. It will be further understood that the dicarbonyl compounds of the present invention may be employed in one or more washing steps if desired, and may also be employed simultaneously with the conventional washing agents and diluents. The combination of the dicarbonyl compounds and conventional washing agents is particularly effective. When the dicarbonyl compounds of this invention are employed in conjunction with inert liquid diluents and/or conventional washing agents, it is preferred that the amount of liquid be about 3 to 20, preferably about 6 to 10, volume ratios based on volume of polymeric product being washed. Particularly preferred combinations of washing agents useful in the present invention are (1) acetyl acetone plus n-butanol and (2) ethyl acetyl acetate plus n-butanol. Such combined wash solutions preferably contain about 0.1 to 10 weight percent of the dicarbonyl compound and 99.9 to 90 weight percent of the alcohol.

It will be understood that the amount of the dicarbonyl compounds of this invention which is used in the washing step as well as the number of washing steps employed will be dependent upon the initial concentration of metal contaminants or ash-forming ingredients in the polymeric product as well as the final concentration of these contaminants which is desired. The amount of dicarbonyl compound employed will also depend upon whether auxiliary conventional washing agents, such as alcohols, are employed in the washing process. In the case of polyethylene, it is generally desirable to reduce the ash content below about 0.01 weight percent when it is desired to use the polyethylene in electrical applications. As far as is known the present invention provides the only method found to date for reducing the ash in polyethylene (prepared by the method described above in detail) to such levels. It will be understood that although the present invention is particularly applicable to polyethylene prepared by employing as a polymerization catalyst a mixture of a reducing compound with reducible metal compound, the present invention is applicable generally to polymeric products prepared by any known method which contain undesirable metal contaminants.

The invention will be more fully understood by reference to the following examples. It is pointed out, however, that the examples are given for the purpose of illustration only and are not to be construed as limiting the scope of the present invention in any way.

EXAMPLE I

In this example, a sample of polyethylene was washed with acetyl acetone in accordance with the present invention and for comparison purposes another sample was washed with n-butanol. The polyethylene was prepared as follows:

The polymer was prepared in a stainless steel continuous reactor equipped with a draft tube with the draft tube flow upwards, the ethylene and catalyst being fed into the draft tube.

Solutions of .044 molar TiCl$_4$ and .044 molar AlEt$_2$Cl previously made up in a refined light mineral oil were premixed in a catalyst premixing vessel. The catalyst was premixed for 36 minutes at 120° F. before going into the reactor (continuous pretreatment so these are average figures). The catalyst was then introduced into the reactor along with some refined light mineral oil diluent to give an overall catalyst weight percent concentration based on diluent of 0.29. Ethylene was also introduced into the reactor at a rate of approximately 0.5 lb./hr. Holding time in the reactor was approximately 1.5 hours. Agitation was accomplished by a 3500 r.p.m. agitator. Catalyst efficiencies of approximately 24 grams of polymer/gram of catalyst were obtained. The polymer product was collected under a refined light mineral oil as it passed through an overflow line on to a filter. The molecular weight of the product was found to be 186,000.

Two samples of the polyethylene prepared as described above were then taken and the first sample was treated with a solution consisting of 20% by volume of n-butanol and 80% by volume of heptane. The second sample was treated with a solution consisting of 20% by volume of acetyl acetone and 80% by volume of heptane. About 4 parts by weight of the wash solutions were employed per part by weight of the polyethylene. The washings of the two samples were made at room temperature with stirring for a 3-hour period. After this treatment, both samples were n-butanol washed (2 parts by volume of n-butanol/part of polymer; 0.1 hour; room temperature) filtered, washed with acetone (5 parts by volume of acetone/part of polymer; 0.1 hour; room temperature) and dried (16 hours at 120° F. under 21" Hg. vac.). Analyses of aluminum and titanium in the polymer product gave the following results:

Table I

| Sample | Treatment | Weight percent | |
|---|---|---|---|
| | | Al | Ti |
| 1 | 3 hr. wash at room temperature with 20% n-butanol in heptane | .063 | .042 |
| 2 | 3 hr. wash at room temperature with 20% acetyl acetone in heptane | .030 | .056 |

It will be noted from the above data that the washing carried out in accordance with the present invention was more than twice as effective as the conventional wash.

EXAMPLE II

A portion of Sample 1 of Example I (i.e., the sample washed with n-butanol and dried) was then refluxed with a solution consisting of 0.2% by weight of acetyl acetone and 99.8 weight percent of acetone. About 10 parts by weight of this wash solution were employed per part by weight of polymer. The total reflux time was approximately 2 hours. Analyses of the resultant polymeric product (Sample 3) gave the following result:

Table II

| Sample | Treatment | Weight percent | |
|---|---|---|---|
| | | Al | Ti |
| 1 | See Example I | .063 | .053 |
| 3 | Refluxed with 0.2% acetyl acetone and acetone | .020 | .056 |

It will be noted that the acetyl acetone wash removed more than two-thirds of the aluminum.

EXAMPLE III

The polyethylene employed in this example was prepared by a method similar to that described in Example I, except 300 p.s.i.g. pressure was used in the reactor. Catalyst premix time was 16 minutes at 139° F. and a lower catalyst concentration was employed (.13 wt. percent). A catalyst efficiency of 38 grams/gram was obtained the product having a molecular weight of 160,000.

In this example three samples of the polymer slurry from the polymerization reactor were washed, employing different treating procedures. In each case, the treatment was carried out at elevated temperatures, namely, at reflux temperatures, in the absence of water. One sample was refluxed for 30 minutes with 500 cc. of a solution consisting of 5% of n-butanol and 95% by volume of heptane. The second sample was refluxed for 60 minutes with 500 cc. of a wash solution consisting of 5% of acetyl acetone and 95% by volume of acetone. The third sample was refluxed for 30 minutes with 500 cc. of a solution consisting of 5% of acetyl acetone and 95% by volume of n-heptane. In each case the amount of polymer slurry treated was about 25 grams. Analyses of aluminum and titanium in the samples of polymer product gave the following results:

*Table III*

| Sample | Treatment | Weight percent | |
|---|---|---|---|
| | | Al | Ti |
| 4 | Reflux 30 min. with 500 cc. of 5% n-butanol in heptane | .500 | .240 |
| 5 | Reflux 60 min. with 500 cc. of 5% acetyl acetone in acetone | .230 | .080 |
| 6 | Reflux 30 min. with 500 cc. of 5% acetyl acetone in heptane | .135 | .032 |

EXAMPLE IV

The polyethylene employed in this example was similar to that described in Example I except the run was made in a glass batch reactor using heptane as a solvent at atmospheric pressure. Premix conditions for the catalyst were 15 minutes at 130° F. An ethylene feed rate of 0.21 lb./hr. during the polymerization was used. Catalyst efficiency was 55 grams/gram with the polymer product having a molecular weight of 61,000.

A sample of the polyethylene was then given four separate washings as follows:

*First washing step.*—750 ml. of n-butanol were added to the polymerization reactor containing the polymerization reaction mixture (about 3,000 ml.). The contents of the reactor were then stirred for 1 hour and left standing over the weekend. The wash liquid was then withdrawn from the reactor through a glass frit under nitrogen atmosphere.

*Second washing step.*—1500 ml. of n-butanol were then added to the polymerization reactor and the contents of the reactor heated to 180° F. with stirring. After 30 minutes, the contents of the reactor were cooled down to 100° F. and the washed liquid was removed as in the first washing step.

*Third washing step.*—This washing step was the same as the second washing step.

*Fourth washing step.*—This washing step was carried out by the same procedure employed in the second washing step except that a mixture of 75 cc. acetyl acetone in 1425 cc. of n-butanol was used as the wash liquid. The polymer was then washed with acetone, filtered and dried and then analyzed for aluminum and titanium. Duplicate samples were submitted, the results being as follows:

*Table IV*

| Sample | Weight percent | |
|---|---|---|
| | Al | Ti |
| 7a | .003 | .002 |
| 7b | .002 | .002 |

The aluminum and titanium analyses reported above correspond to a calculated ash value of about 0.007–0.009 weight percent.

EXAMPLE V

The polyethylene employed in this example was similar to that described in Example I except that a stainless steel autoclave type reactor was used in place of the draft tube reactor. Agitation was lowered to 1725 r.p.m. and a pressure of 10 p.s.i.g. was used. The reaction was run at 120° F. using an ethylene feed rate of .71 lb./hr. The catalyst (wherein the reducing compound was 93% AlEt$_2$Cl, 7% AlEtCl$_2$) was pretreated for 57 minutes at 99° F. A catalyst efficiency of 91 g./g. was obtained.

The molecular weight of the product was about 527,000.

The polyethylene product from the polymerization reaction was then given a first-stage butanol wash as follows:

The polymeric product was washed for 2 hours at 180° F. using approximately 6 parts by weight of n-butyl alcohol per part by weight of polymer. Washing was carried out in two twelve liter flasks equipped with stirrers and reflux condensers. The butanol washed product (Sample 8) was then divided: one-half was treated conventionally by giving it a second (Sample 11) and third-stage (Sample 14) butanol washing by the same procedure described above for the first-stage butanol wash; the other half was divided into two parts and treated as follows. One of the parts was given a second (Sample 9) and third-stage (Sample 12) washing with a wash solution consisting of 95 volume percent of butanol and 5 volume percent acetone. The other portion was given a second (Sample 10) and third-stage (Sample 13) washing with a wash solution consisting of 99 volume percent of butanol and 1 volume percent of acetyl acetone. Each washing stage was carried out with stirring at a temperature of about 190° F. for about 2 hours. The results of these various washing operations are set forth in Table V:

*Table V*

WASHING OF POLYETHYLENE

| Sample No. | Treatment of Sample | Weight Percent Al | Weight Percent Ti | Weight Percent oxide ash [1] |
|---|---|---|---|---|
| 8 | 2-hour wash with n-butanol at 190° F., 1st stage. | 0.008 | 0.013 | 0.036 |
| 9 | 2-hour wash with n-butanol +5 vol. percent acetyl acetone in n-butanol at 190° F., 2nd stage. | 0.001 | 0.001 | 0.0035 |
| 10 | Same as above (9) except 1 vol. percent acetyl acetone in n-butanol was used in the 2nd stage. | 0.002 | 0.001 | 0.0042 |
| 11 | 2nd stage butanol wash, 2 hours at 190° F. | 0.006 | 0.007 | 0.023 |
| 12 | 3rd stage butanol +5 vol. percent acetyl acetone wash, 2 hours at 190° F. | 0.001 | 0.001 | 0.0035 |
| 13 | 3rd stage butanol +1 vol. percent acetyl acetone wash, 2 hours at 190° F. | 0.001 | 0.001 | 0.0035 |
| 14 | 3rd stage butanol wash, 2 hours at 190° F. | 0.008 | 0.006 | 0.031 |

[1] Calculated value.

The data presented in Table V show that small amounts of acetyl acetone are very effective washing agents for the removal of aluminum and titanium from the polyethylene. On the other hand, the washing of the polyethylene solely with n-butanol was relatively ineffective. It will also be noted that reduction of oxide ash to less than about 0.005 weight percent can be achieved by second-stage washing of the polymer with 1 to 5 volume percent acetyl acetone and n-butanol. A sample of the acetone washed polyethylene of this example was molded and found to have good color and to have electrical properties comparable to commercial grade polyethylenes made by processes involving no use of metal catalysts.

EXAMPLE VI

The polyethylene employed in this example was similar to that described in Example I. Two portions of the polyethylene were slurried with a refined mineral oil having a boiling range of about 400° to 505° F. to prepare two slurries. One of the slurries contained 6.5 weight percent of the polyethylene and the other slurry contained about 14 weight percent of the polyethylene. The first slurry was then washed for 2 hours at a temperature of 180° to 190° F. with n-butanol using about 14 parts by weight of n-butanol per weight of polymer. The second slurry was washed for about 2 hours at 180° to 190° F. with a solution consisting of 5% of ethyl aceto acetate and 95 volume percent of n-butanol using about 7 parts by weight of the wash solution per part by weight of the polyethylene. After the washing steps described above, the polyethylene was recovered as follows: The polyethylene slurry was filtered, washed with acetone (10 parts acetone by weight per part by weight of the polymer) and air dried overnight. The samples which were analyzed were vacuum dried 140° F. at 21″ Hg prior to analysis. The two samples of polyethylene washed as described above were then analyzed for aluminum, titanium and iron, the results of which are summarized below:

*Table VI*

| Sample | Treatment | Weight percent conc'n slurry | Weight percent | | |
|---|---|---|---|---|---|
| | | | Al | Ti | Fe |
| 15 | 2 hr. wash with n-BuOH at 180–190° F. | 6.5 | .023<br>.021 | .010<br>.010 | .006<br>.004 |
| 16 | 2 hr. wash with 95% n-BuOH plus 5% ethyl aceto acetate at 180–190° F. | 14 | .003<br>.003 | .006<br>.006 | .002<br>.003 |

As can be seen from the data in Table VI the use of the ethyl aceto acetate solution was considerably more effective in lowering the metal content of the polymer than was the use of butanol alone. It should be noted that the more effective results which were obtained in employing a washing in accordance with the present invention were realized even though a more concentrated slurry was employed in this case than was employed in the butanol-only wash, and even though less wash solution was employed in this case than was employed in the butanol-only wash.

What is claimed is:

1. Method for removing heavy metal constituents in catalyst residues from solid polymerized alpha olefins selected from the group consisting of ethylene and propylene prepared with a heavy metal catalyst formed by admixing an aluminum alkyl with compounds of the group consisting of metals of the group IV–B, V–B, and VI–B of the periodic system which comprises washing the polymer in the solid, plastic phase at a temperature between 80 and 250° F. and in the absence of water with a liquid organic solvent containing 0.1 to 50 weight percent, based on polymer, of a dicarbonyl compound chelating agent having the formula

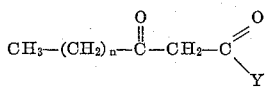

where $a$ is an integer having a value of 0 to 3 and Y represents a member selected from the group consisting of a hydrogen atom and the radicals OR and R′, R and R′ representing alkyl radicals containing 1 to 4 carbon atoms, the volume of such solvent being equal to 3 to 20 times the volume of polymer being washed.

2. Method according to claim 1 wherein the polymer is also washed with a saturated aliphatic alcohol and an aromatic hydrocarbon diluent.

3. Method according to claim 2 in which the alcohol is methyl alcohol and the dicarbonyl compound is acetylacetone.

4. Method according to claim 1 wherein said dicarbonyl compound is acetyl acetone.

5. Method according to claim 1 wherein said dicarbonyl compound is ethyl aceto acetate.

6. Method according to claim 1 wherein said aluminum compound is selected from the group consisting of aluminum trialkyls and dialkyl aluminum halides.

7. Method according to claim 1 wherein the polymer is also washed with a saturated aliphatic alcohol.

8. Method according to claim 7 wherein said alcohol is butyl alcohol.

9. Method according to claim 1 wherein said polymer is washed with said dicarbonyl compound in the presence of saturated hydrocarbon diluent.

10. Method according to claim 1 wherein the concentration of said dicarbonyl compound in said washing is about 0.1 to 10% by weight, based on the polymer, said dicarbonyl compound being used as a wash liquid consisting of an inert organic liquid diluent plus said dicarbonyl compound, and the total amount of such wash liquid being equal to 6 to 10 times the volume of polymer being washed.

11. Method according to claim 1 wherein the washing is carried out at a temperature of about 80° to 250° F. for about 0.5 to 24 hours.

12. Method for removing heavy metal constituents in catalyst residues from solid polymerized ethylene prepared with a heavy metal catalyst formed by admixing titanium tetrachloride with an aluminum compound selected from the group consisting of aluminum trialkyls and dialkyl aluminum halides, which comprises washing the polyethylene in the solid, plastic phase, in the absence of water, with 6 to 10 volumes per volume of polyethylene of a solvent consisting of an inert organic diluent plus about 0.1 to 10% by weight of acetyl acetone at a temperature of about 160° to 200° F. for about 2 to 6 hours.

13. Method according to claim 12 wherein the polyethylene is washed with n-butyl alcohol prior to washing with said acetyl acetone containing butyl alcohol solvent.

14. Method for removing heavy metal constituents in catalyst residues from solid polymerized ethylene prepared with a heavy metal catalyst formed by admixing titanium tetrachloride with an aluminum compound selected from the group consisting of aluminum trialkyls and dialkyl aluminum halides, which comprises washing the polyethylene in the solid, plastic phase, in the absence of water with about 0.1 to 10% by weight of ethyl aceto acetate at a temperature of about 160° to 200° F. for about 2 to 6 hours.

15. Method according to claim 14 wherein the polyethylene is also washed with butyl alcohol.

16. Method for removing heavy metal constituents in catalyst residues from solid polymerized alpha olefins selected from the group consisting of ethylene and propylene prepared with a heavy metal catalyst formed by admixing an aluminum alkyl with a titanium compound which comprises washing the polymer in the solid, plastic phase at a temperature between 80 and 250° F. and in the absence of water with a liquid organic solvent containing 0.1 to 50 weight percent, based on polymer, of a dicarbonyl compound chelating agent having the formula

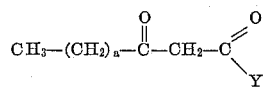

where $a$ is an integer having a value of 0 to 3 and Y represents a member selected from the group consisting of a hydrogen atom and the radicals OR and R′, R and R′ representing alkyl radicals containing 1 to 4 carbon atoms, the volume of such solvent being equal to 3 to 20 times the volume of polymer being washed.

17. Method for removing heavy metal constituents in catalyst residues from solid polymerized alpha olefins selected from the group consisting of ethylene and propylene prepared with a heavy metal catalyst formed by admixing an aluminum alkyl with titanium tetrachloride which comprises washing the polymer in the solid, plastic phase at a temperature between 80° and 250° F. and in the absence of water with a liquid organic solvent containing 0.1 to 50 weight percent, based on polymer, of a dicarbonyl compound chelating agent having the formula

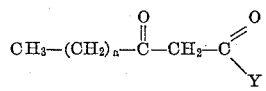

where $a$ is an integer having a value of 0 to 3 and Y represents a member selected from the group consisting of a hydrogen atom and the radicals OR and R', R and R' representing alkyl radicals containing 1 to 4 carbon atoms, the volume of such solvent being equal to 3 to 20 times the volume of polymer being washed.

18. Method for removing heavy metal constituents in catalyst residues from solid polymerized alpha monoolefins prepared with a heavy metal catalyst formed by admixing an aluminum alkyl with compounds of the group consisting of metals of the groups IV–B and V–B and VI–B of the periodic system, which comprises washing the polymer in the solid phase with a liquid solvent containing a β-diketone chelating agent.

References Cited in the file of this patent

UNITED STATES PATENTS

| | | |
|---|---|---|
| 2,667,522 | McElroy | Jan. 26, 1954 |
| 2,721,189 | Anderson | Oct. 18, 1955 |
| 2,814,610 | Braidwood et al. | Nov. 26, 1957 |
| 2,827,445 | Bartolomeo et al. | Mar. 18, 1958 |

FOREIGN PATENTS

| | | |
|---|---|---|
| 533,362 | Belgium | Nov. 16, 1954 |

OTHER REFERENCES

Martell and Calvin: "Chemistry of the Metal Chelate Compounds," Prentice-Hall, 1952 (pages 451–458).